United States Patent [19]
Epp et al.

[11] Patent Number: 5,740,903
[45] Date of Patent: Apr. 21, 1998

[54] FEED DEVICE FOR A MATERIAL TRANSPORTATION TUBE

[76] Inventors: Richard J. Epp; Dwayne S. Epp, both of Box 64, Fiske, Saskatchewan, Canada, S0L 1C0

[21] Appl. No.: 585,590

[22] Filed: Jan. 16, 1996

[51] Int. Cl.$^6$ .................................................. B65G 17/28
[52] U.S. Cl. ........................................ 198/594; 198/588
[58] Field of Search ........................... 198/586, 587, 198/588, 594, 812, 313

[56] References Cited

U.S. PATENT DOCUMENTS

| | | | |
|---|---|---|---|
| 3,974,908 | 8/1976 | Keichinger | 198/594 X |
| 4,226,477 | 10/1980 | Capoccia | 198/594 X |

FOREIGN PATENT DOCUMENTS

| | | | |
|---|---|---|---|
| 0049127 | 3/1965 | Poland | 198/588 |

Primary Examiner—James R. Bidwell
Attorney, Agent, or Firm—Adrian D. Battison; Murray E. Thrift

[57] ABSTRACT

A feed device for transporting material from a remote location to a feed lower end of a transportation auger comprises a belt carried on a support frame with that support frame being stored in a stored position on top of the main auger tube. The auger tube carries a guide track with a support head movable along the track from a raised position at the top of the track to a lowered position at the bottom of the track. The support head pushes the feed device along the track to a deployed position beyond the lower end of the track at which the support head carries the upper end of the feed device and hold it at a position so that the feed material carried by the feed device is deposited at the lower end of the auger tube.

19 Claims, 5 Drawing Sheets

FEED DEVICE FOR A MATERIAL TRANSPORTATION TUBE

BACKGROUND OF THE INVENTION

This invention relates to a feed device for mounting on a material transportation tube and particularly but not exclusively to a device which moves particulate material from an initial feed position to the lower end of the tube for entry into the transportation means within the tube.

In farming, augers are well known for transporting particulate material through the auger tube from a lower feed end to a raised discharge end. Generally the auger includes an auger flight which rotates around a shaft within the tube so as to carry the material longitudinally of the tube. Other similar transportation devices use a belting within the tube and the present invention is applicable to devices of this type which include within the transportation tube either an auger, a belt or other transportation elements.

In some cases the auger tube has at its lower end simply a hopper so that the material can be discharged into the hopper for transportation along the tube. Other types of auger include a feed device which is separate auger section pivotally connected to the lower end of the main auger tube and movable around the lower end of the auger tube to different angular positions so as to receive the material from an initial feed point, for example the discharge of a truck or the bottom of a hopper bottom bin and to move the material from that initial feed point to the lower end of the auger.

However these feed auger systems are generally unwieldy and difficult to move to a storage position on the main auger thus limiting or restricting the maneuverability of the main auger for transportation from site to site.

SUMMARY OF THE INVENTION

It is one object of the present invention, therefore, to provide an improved material handling apparatus which includes a main transport device having a tube and a feed transport device for feeding the lower end of the tube in which the feed transport device is readily movable to a storage position and equally readily deployed.

According to one aspect of the invention there is provided a material handling apparatus for transporting a particulate material comprising: a main transport device having an elongate transportation tube, means for supporting the tube with a lower feed end and an upper discharge end and a transportation means in the tube for moving the material from the lower end to the upper end; a feed transport device for moving the material from an initial feed point to the lower feed end of the main transport device for transport therein; the feed transport device comprising an elongate transport body having a transportation means thereon for transporting the material along the transportation body from a feed to a discharge end; and mounting means for mounting the feed transport device on the transportation tube such that, in an operating position, the discharge end of the feed transport device is arranged at the lower feed end of the tube and the feed end of the feed transport device is movable to different positions relative to the lower feed end of the tube; the mounting means comprising a support head, means pivotally connecting the support head to the transport body at the discharge end thereof, guide track means extending along a top surface of the tube at the lower end thereof longitudinally of the tube, and means for moving the support head along the guide track means from the operating position to a raised position in which the feed transport device is pulled into a transport position on top of the tube.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
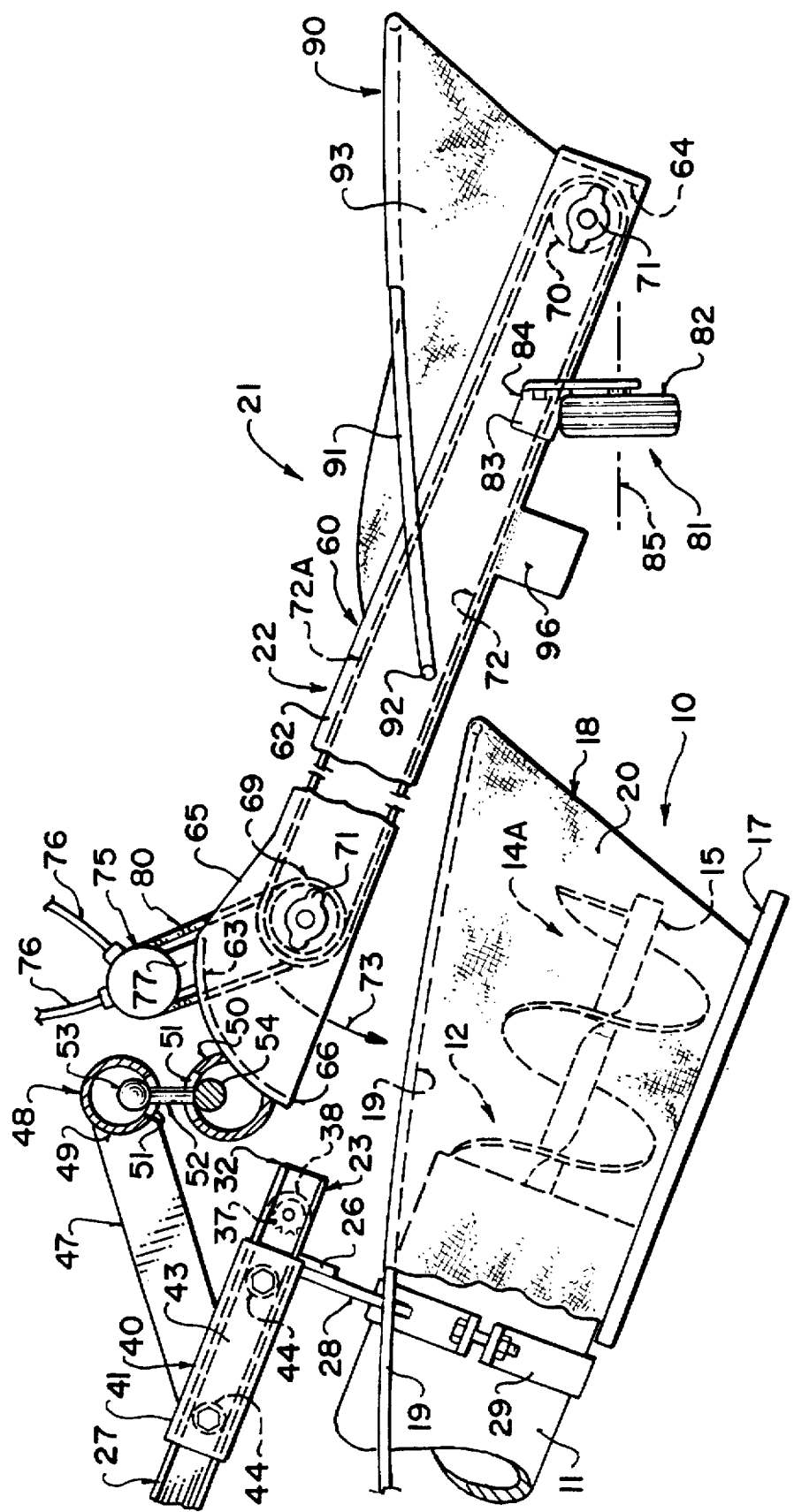
FIG. 1 is a side elevational view of a lower part only of a transportation auger and feed device according to the present invention, the feed device being shown in a deployed position.

The apparatus as shown in the drawings comprises a main transport device generally indicated at 10 in the form of a conventional transportation auger having an auger tube 11 with a lower feed end 12 and an upper discharge end schematically indicated by the arrow 13. Within the tube 11 is mounted an auger flight 14 mounted on a drive shaft 15 which is driven in conventional manner by a drive motor (not shown). The auger includes a support assembly schematically indicated at 16 by which the auger tube is supported in its inclined position so as to raise the upper end 13. At the lower end of the auger tube includes a hitch coupling 17 connected to the tube at the bottom of the tube and extending underneath a feed end portion 14A of the auger flight. Around the feed end portion 14A is mounted a collapsible hopper 18 having a spring wire support 19 and a fabric confining wall 20 so as to direct material dropping to the lower end of the auger into the area of the portion 14A of the flight so as to be grasped by the flight and carried through the auger tube.

It will be appreciated that an auger of this type is of course well known and very widely used in the farming industry. While the main transportation device is illustrated as including an auger flight, is also possible for the present arrangement to employ a belt type transportation device in which the tube contains a belt which is guided from a feed end to run through the inside of the tube. In addition of the types of transportation arrangement can be used.

On the main transportation device is mounted a feed transport device generally indicated at 21 which is arranged to be movable relative to the feed end 12 of the main transportation auger so as to provide an initial feed from a position remote from the feed end 12 to the feed end 12. Transportation devices have previously been proposed for feeding material into the lower end of the main transportation auger but in many cases these are difficult to store on the main auger for transportation therewith and are difficult to maneuver.

The feed transport device 21 of the present invention therefore includes a transport element 22 which is mounted on a guide track 23 carried on top of the tube 11 adjacent the lower end thereof.

Figure 2:
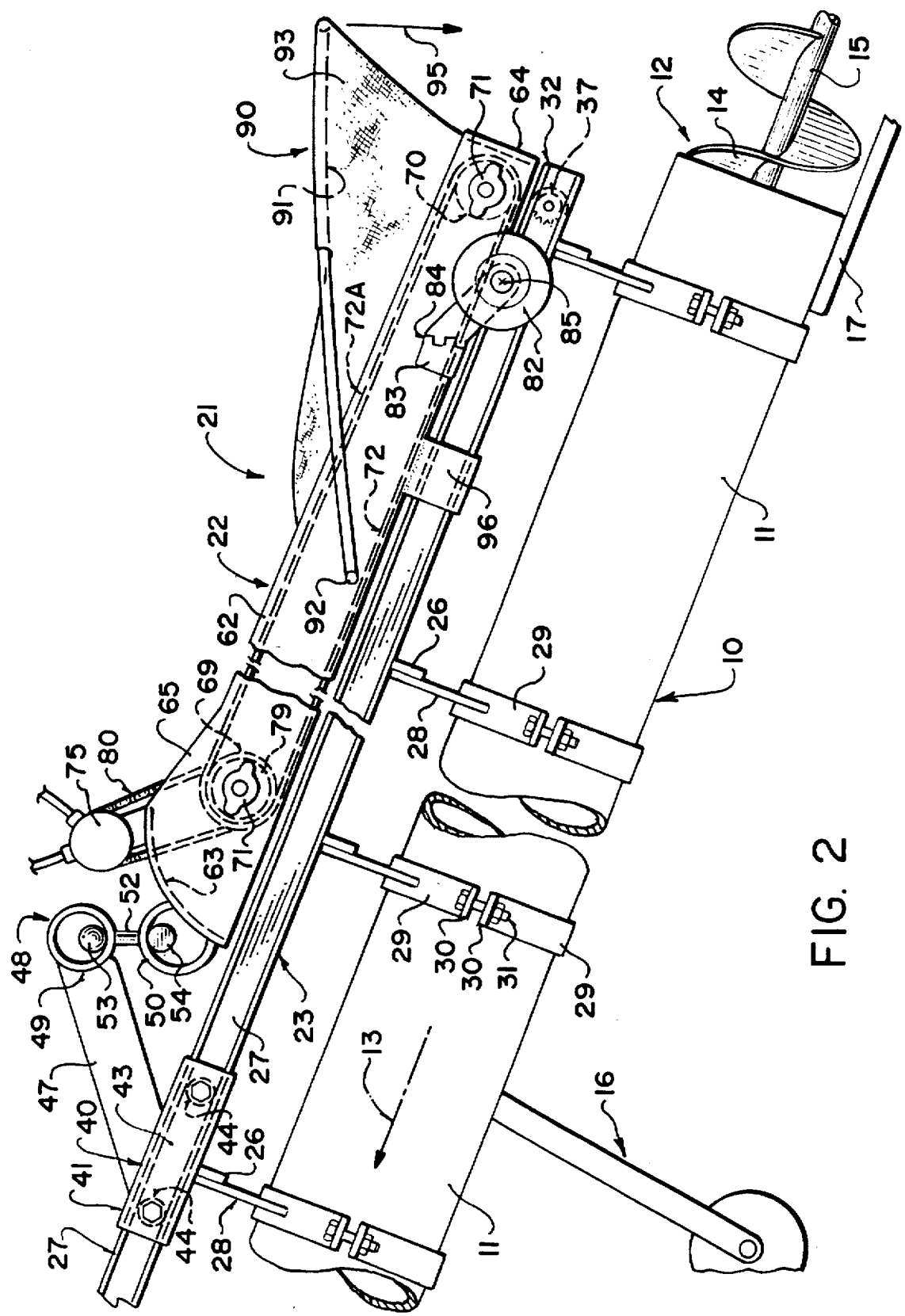
FIG. 2 is a similar side elevational view to that of FIG. 1 showing the feed device in a retracted stored position.
Figure 4:
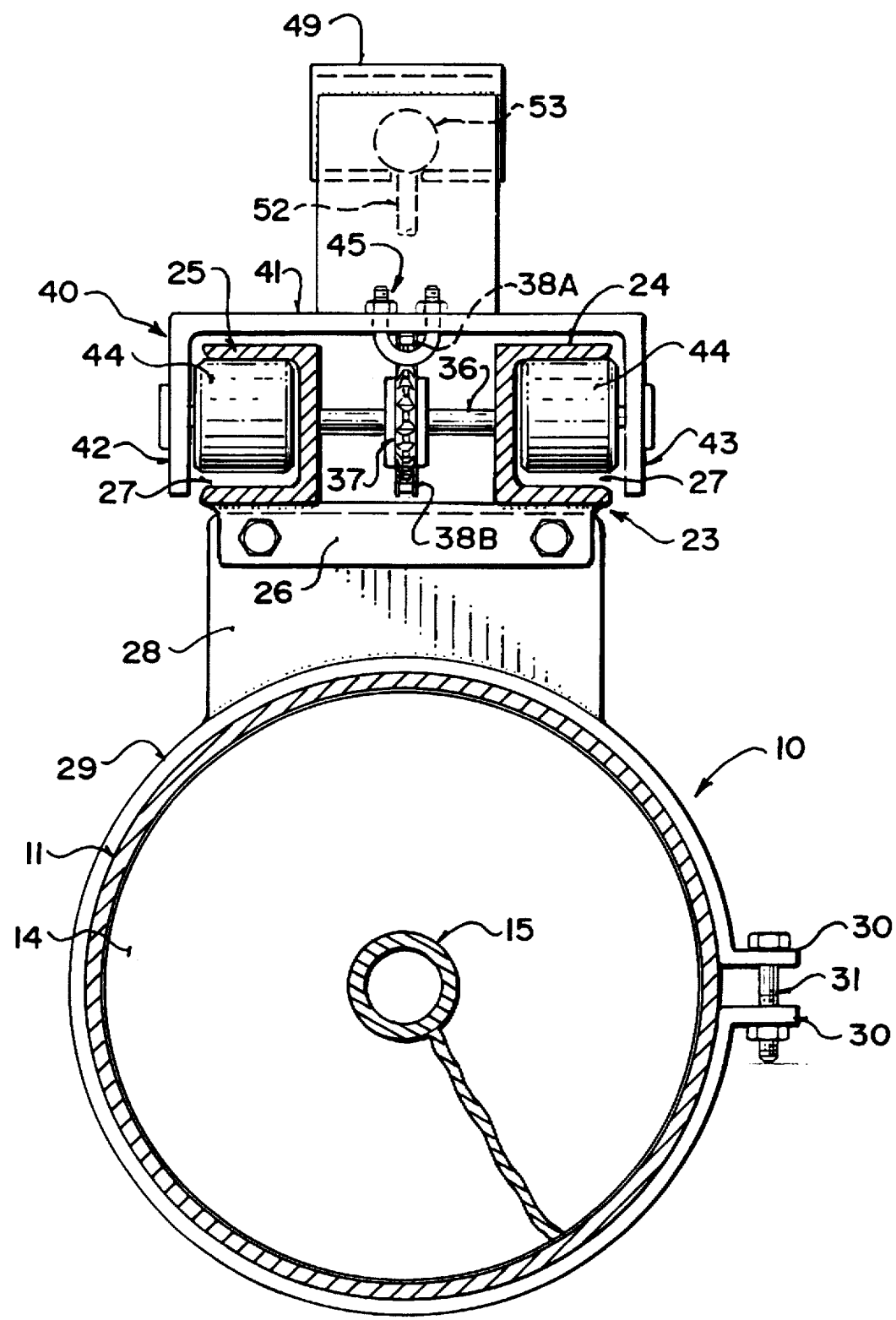
FIG. 4 is a cross sectional view along the lines 4—4 of FIG. 3.
Figure 5:
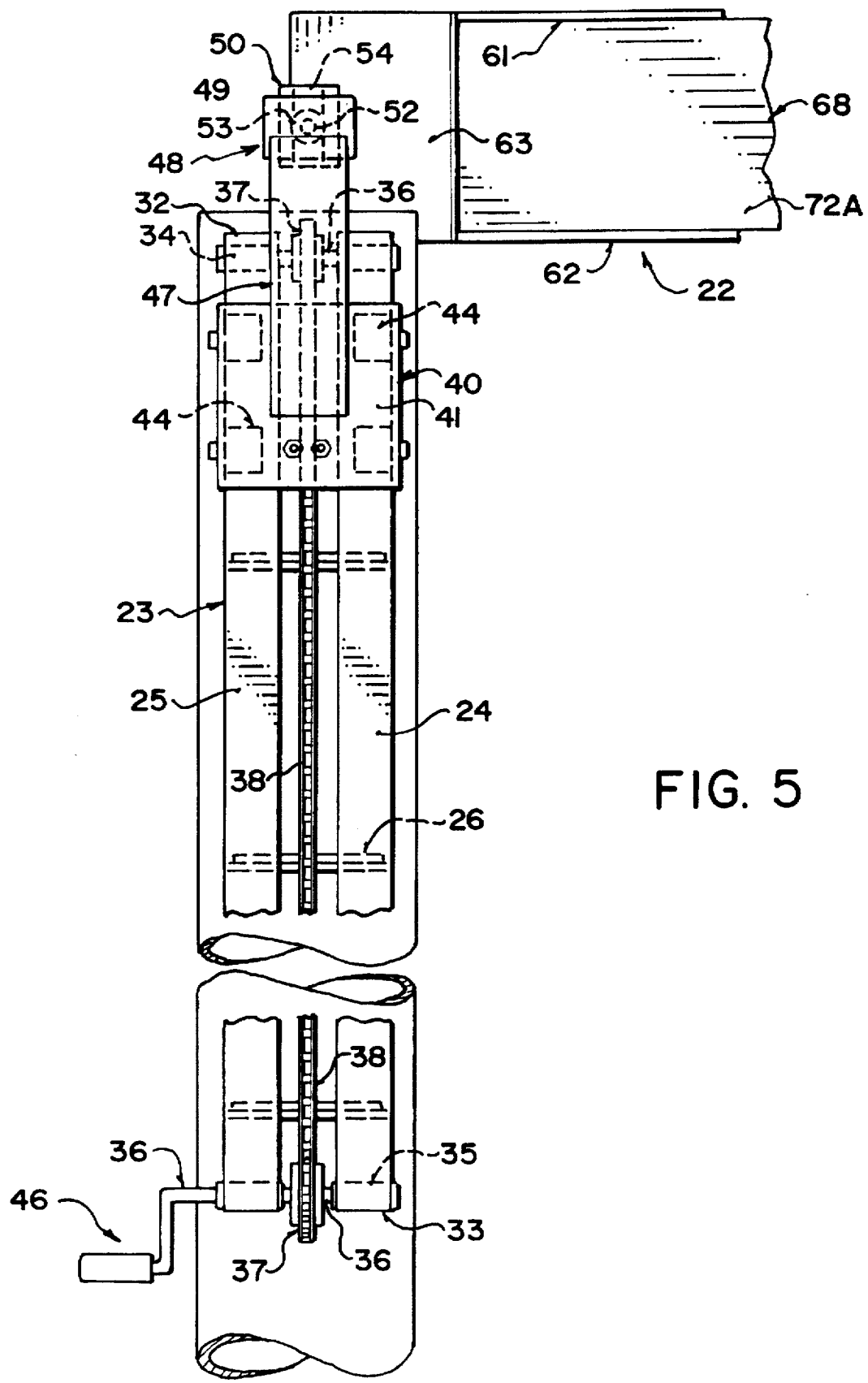
FIG. 5 is a top plan view similar to that of FIG. 3 but showing also a part of the auger tube carrying the guide track and showing the upper part only of the feed device in a rotated position.

The guide track 23 as best shown in FIGS. 2, 4 and 5, includes a pair of rails 24 and 25 which are parallel and interconnected by a plurality of transverse braces 26 which connect the rails and hold them in parallel spaced positions. Each of the rails is formed by a channel member with the base webs of the channel members adjacent so that the channels have open faces 27 which face away from one another.

Each transverse coupling member 26 is attached to a support web 28 which extends from an underside of the guide track downwardly to a plurality of coupling rings 29 which are clamped around the tube 11 at spaced positions along the length of the tube with each ring having a pair of flanges which are squeezed together by a bolt 31. The length of the track is greater than the length of the transport device 22 and the track extends from the lower end 32 at the lower end 12 of the tube 11 to an upper end 33 spaced upwardly along the length of the tube.

Welded across each of the upper and lower ends of the track 23 is provided a pair of bearing sleeves 34 and 35 respectively. Each bearing sleeve carries a shaft 36 which lies in a common plane with the rails 24 and 25 and is at right angles thereto. Each of the shafts 36 carries a sprocket 37 rotatable with the shaft about the axis of the shaft with the two sprockets thus aligned and carrying a chain 38 with an upper run 38A and a lower run 38B. The chain is thus located between the two rails 24 and 25 with the upper run adjacent to an upper surface of the rails or slightly above the upper surface of the rails.

On the guide track 23 is mounted a support head 40 for rolling movement along the guide track. The support head includes an upper flat plate 41 and a pair of depending sides 42 and 43. The upper plate 41 has a width slightly greater than the width of the guide track so that the side plates 42 and 43 depend downwardly outside the open faces 27 of the rails 24 and 25. Each of the plates 42 and 43 carries a respective pair of rollers 44 so that the rollers project from the inside surface of the respective plate 42, 43 into the channel defined by the respective rail 24, 25. The rollers thus run against the upper or lower surfaces of the respective channel depending upon the loading applied so that the support head can roll along the guide track from the upper to the lower end. The top plate 41 carries a U-clamp 45 which clamps a link of the upper run 38A of the chain to the upper plate 41 so that the support head is clamped onto the chain and is moved thereby as the chain moves longitudinally around the sprockets 37.

The shaft 36 at the upper end of the guide track carries a drive assembly generally indicated at 46 which can be in the form of a simple hand crank as illustrated in FIG. 5 or it can be a hydraulic motor to avoid the manual effort necessary for the hand crank.

Thus the support head 40 can be moved up and down the guide track.

The support head 40 includes a support arm 47 which is welded to the top plate 41 and extends upwardly therefrom and is inclined downwardly along a central plane of the auger tube toward the lower end of the auger tube. At an outer end of the arm 47 is mounted a pivot coupling 48 which connects from the arm to the transport device 22. The arm extends to a position beyond the lower end of the plate 41 and when the plate is in the lower position on the guide track extends to a position beyond the lower of the guide track.

The pivot coupling 48 can be of any suitable design but in the example as shown comprises a first sleeve 49 welded on to the end of the arm and a second sleeve 50 welded on the end of the transport device 22. Each of the sleeves has a slot 51 in its surface extending angularly around the sleeve for receiving a pin 52 and allowing that pin to rotate to a limited extent around the respective axis of the respective sleeve. At the top end of the pin is mounted a ball 53 having a diameter greater than the width of the slot 51 so that the ball is retained within the sleeve while the pin 52 projects through the slot. At the lower end of the pin 52 is provided a rod 54 which extends along the length of the sleeve 50. The rod 54 thus retains the pin within the sleeve and allows only pivotal movement of the rod about the axis of the sleeve 50. The ball 53 allows both pivotal movement of the rod 52 about the axis of the sleeve 49 and also allows rotation of the sleeve 50 relative to the sleeve 49 about the axis of the pin 52.

Figure 3:
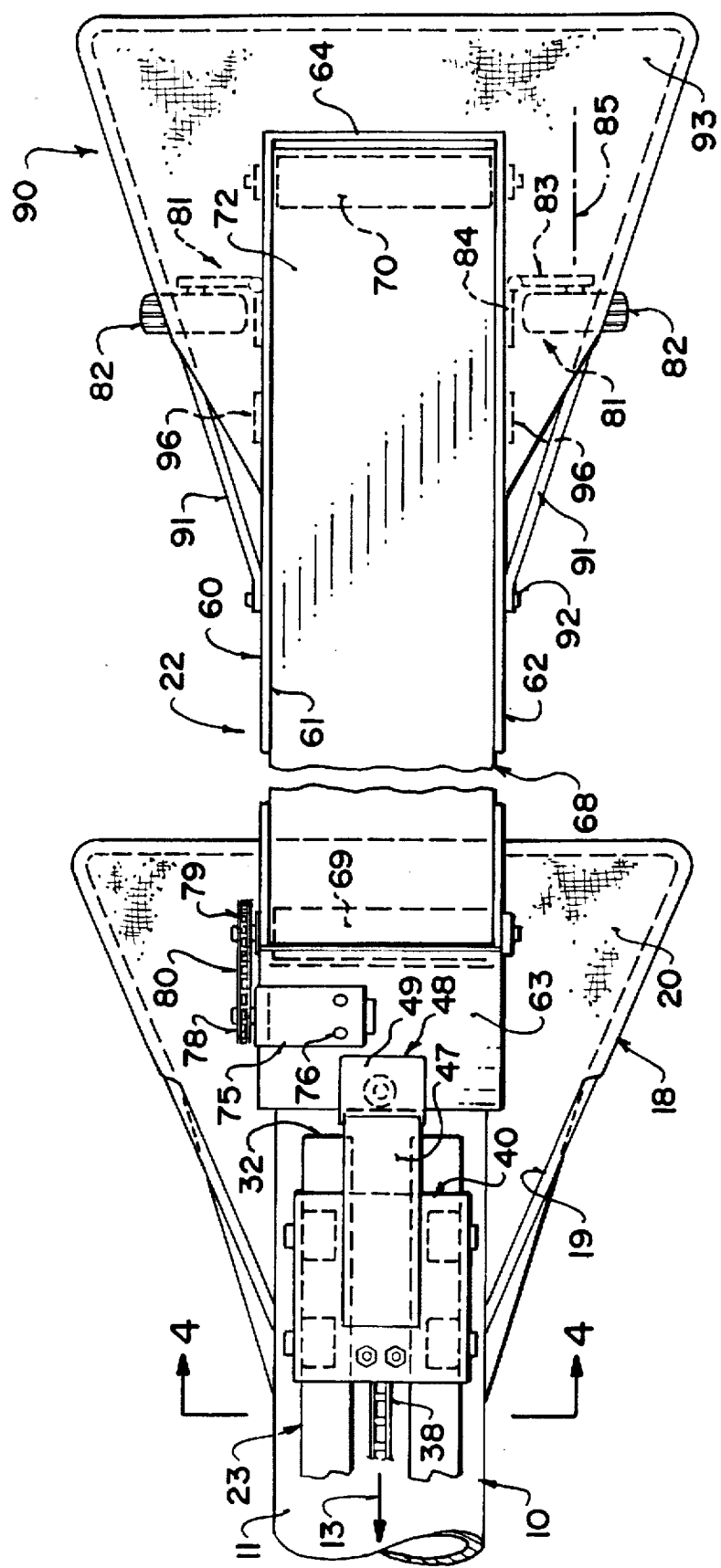
FIG. 3 is a top plan view of the parts of the apparatus as shown in FIG. 1.

The transport device 22 is best shown in FIGS. 1 and 3 and comprises an outer frame 60 defined by side walls 61 and 62 which are interconnected at a forward end by a curved guide plate 63 and at a rearward end by a transverse coupling plate 64. The side plate 61 and 62 are elongate, vertical and parallel and spaced by the width of the transport device. At a forward end each of the side plates 61 and 62 includes an upwardly inclined upper surface 65 so that the height of the side plates gradually increases toward the forward end at the guide plate 63. The guide plate 63 interconnects the side plate 61 and 62 from the upper end of the guide plate at the upper surface 65 and extends from the upper end to a lower end 66 at the bottom edge of the side plates 61 and 62. The bottom edge of the side plate 61 and 62 is horizontal. The end coupling plate 64 is at right angles to both of the sides plates and has upper and lower edges coincident with the upper and lower edges of the side plates. The frame 60 is thus generally rectangular and elongate. For convenience of illustration the full length of the frame is not shown and it will be appreciated that the length is cut short in FIG. 1 so that the lower end of the frame as shown does not extend to its full position which would normally be at the same height as the lower end of the hitch 17.

The sleeve 50 is welded to the front face of the guide plate 63 at a position adjacent its lower end 66. The whole frame 60 is thus suspended from the pivotal coupling 48 but can be moved so that the lower end of the frame 60 can be raised, lowered, and rotated about the vertical axis of the pin 52 relative to the outer end of the arm 47. Inside the frame 60 is mounted a belt conveyor generally indicated at 68 which includes a front guide roller 69 and a rear guide roller 70 both of which are mounted on the side walls 61 and 62 for rotation relative thereto about an axis longitudinal of the rollers. Thus the side walls carry bearings 71 which support the rollers 70. Around the rollers 70 and 69 is wrapped a belt 71 which has an upper run 72 defining a support surface for conveying material deposited at any position along the length of the belt to the upper end of the belt at the roller 69. The roller 69 is spaced rearwardly from the guide wall 63 so as to define opening therebetween the material from the belt can be discharged as indicated by the arrow 73.

The roller 69 forms a drive roller which is driven by a hydraulic motor 75 from hydraulic lines 76. The motor 75 in one embodiment is mounted on a bracket 77 carried on the outer surface of the guide plate 63. The drive motor 75 carries a sprocket 78 which drives a similar sprocket 79 on the roller 69 via a chain 80. In an alternative arrangement (not shown) the motor 75 is directly mounted on the axle of the roller 69 so as to avoid the chain and sprocket interconnection. The roller 70 is selected to be as small as possible in diameter so as to minimize the height of the lower end of the frame 60 to pass under obstacles for example to reach hopper bottom discharge ports on a truck. Thus the roller 69 is preferably larger in diameter than the roller 70.

The side walls 61 and 62 each carry a ground wheel assembly for supporting the frame 60 in movement across the ground. Each ground wheel assembly includes a ground wheel 82 and a bracket 83 attached to the respective side wall, the bracket providing a bearing support for the ground wheel 82 allowing rotation of the ground wheel relative to the bracket about an axis of the ground wheel. The ground wheel is mounted as close as possible to the lower end of the frame 60 so as to be sure to engage the ground first as the frame is lowered to the ground from the guide track.

The wheels can be steerable by a hydraulic cylinder to allow the frame to be steered as it moves down the guide track. In the arrangement shown the steering is manual so that the bracket 83 includes a hinge portion 84 so that the ground wheel axis 85 can be rotated from a first position shown in FIG. 2 in which the axis is at right angles to the respective side wall to a second position shown in FIGS. 1 and 3 in which the axis 85 is parallel to the respective side wall. Thus in the position shown in FIG. 2, the ground wheels allow rolling movement across the ground in a direction longitudinal of the frame so that the frame rolls directly outwardly in a direction longitudinal of the guide track. When the frame is fully deployed to a position spaced outwardly away from the feed end 12 of the main auger, the ground wheels 82 can be rotated manually by pivotal movement about the hinge 84 to take up a position shown in FIGS. 1 and 3. In this position the frame 60 can be moved side to side that is the frame rotates around the vertical axis defined by the pin 52.

At the outer end of the frame 60 is mounted a flexible or collapsible hopper generally indicated at 90 with a wire support 91 pivotally connected to the respective side of the frame as indicated at 92 and a fabric guide wall 93 which is engaged over the wire frame and extends therefrom downwardly to the respective side walls and to the end wall. The fabric is clamped to the side and end walls to form an enclosure by a suitable clamping system (not shown). The hopper can thus be collapsed as indicated by the arrow 95 to a collapsed position generally flat on the frame 60. In the erected position generally shown in FIG. 1, the hopper provides a raised area surrounding the lower end of the feed device so that the material dropped in the area of the hopper is guided by the fabric 93 to fall onto the lower end of the belt for transportation thereby.

A guide arrangement is provided between the transport device and the guide track to maintain the transport device in allignment on the track when retracted to the storage position. This can comprise a pair of lugs mounted on the rails 24 and 25 and standing upwardly therefrom, in which case the track 23 is wider than the frame 60. In the arrangement shown, each side wall 61, 62 has a downwardly depending lug 96 which engages the sides of the guide track when the feed device is in the raised stored position shown in FIG. 2.

From the raised stored position shown in FIG. 2, therefore, the feed device can be lowered to the ground by the operator effecting movement of the chain in the required direction thus pushing the support head 40 downwardly along the guide track so that the feed device slides over the guide track to a position where the ground wheels 82 engage the ground following which further movement of the support head pushes the feed device outwardly away from the lower end 12 of the auger tube. When fully extended, the wheels 82 are rotated and the feed device can be moved side to side to a required position relative to the lower end of the auger tube. The support head including particularly the arrangement of the arm 47 ensures that the upper end of the feed device is located immediately over the lower end of the auger tube so that the material discharged onto the belt is necessarily carried along the feed device to the lower end of the auger tube for transportation along the auger tube.

Once use of the feed device is complete, the operation is reversed so that the feed device is moved back to a position aligned with the guide track and then pulled back onto the guide track by operation of the crank drive 46.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A material handling apparatus for transporting a particulate material comprising:

a main transport device having an elongate transportation tube, means for supporting the tube with a lower feed end and an upper discharge end and a transportation means in the tube for moving the material from the lower end to the upper end;

the tube having an open top hopper at the lower feed end thereof;

a feed transport device for moving the material from an initial feed point to the hopper at the lower feed end of the main transport device for transport therein;

the feed transport device comprising an elongate transport body arranged for carrying the material along the transportation body and for supporting the material away from a ground surface as the material is carried from a feed end to a discharge end;

and mounting means for mounting the feed transport device on the transportation tube such that the feed transport device is movable to different positions relative to the lower feed end of the tube;

the mounting means comprising a support head, connecting means pivotally connecting the support head to the transport body of the feed transport device at the discharge end thereof, a guide track extending along a top surface of the tube at the lower end thereof longitudinally of the tube, and means for moving the support head along the guide track from an operating position to a raised position in which the feed transport device is pulled into a transport position on the top surface of the tube;

the support head and the guide track being arranged such that in the operating position the discharge end of the feed transport device is located above the hopper for discharging the material carried thereby downwardly into the hopper.

2. The apparatus according to claim 1 wherein the feed transport device comprises a belt arranged for carrying the material on an upper run of the belt.

3. The apparatus according to claim 1 wherein the transportation means of the main transport device comprises an auger flight.

4. The apparatus according to claim 1 wherein the guide track includes support means carrying the guide track at a position spaced upwardly from the top surface of the tube and parallel thereto and wherein the support means includes a plurality of longitudinally spaced elements each having a strap portion for engaging the tube.

5. The apparatus according to claim 1 including engagement means for locating the feed transport device in the raised position on the guide track.

6. The apparatus according to claim 5 wherein the engagement means comprises a pair of lugs each arranged at a respective side of the feed transport means and extending downwardly therefrom to engage a respective side of the guide track.

7. A material handling apparatus for transporting a particulate material comprising:

a main transport device having an elongate transportation tube, means for supporting the tube with a lower feed end and an upper discharge end and a transportation means in the tube for moving the material from the lower end to the upper end;

the tube having an open top hopper at the lower feed end thereof;

a feed transport device for moving the material from an initial feed point to the hopper at the lower feed end of the main transport device for transport therein;

a feed transport device comprising an elongate transport body arranged for carrying the material along the transportation body and for supporting the material away from a ground surface as the material is carried from a feed end to a discharge end;

and mounting means for mounting the feed transport device on the transportation tube such that the feed transport device is movable to different positions relative to the lower feed end of the tube;

the mounting means comprising a support head, connecting means pivotally connecting the support head to the transport body of the feed transport device at the discharge end thereof, a guide track extending along a top surface of the tube at the lower end thereof longitudinally of the tube, and means for moving the support head along the guide track from an operating position to a raised position in which the feed transport device is pulled into a transport position on the top surface of the tube;

the support head and the guide track being arranged such that in the operating position the discharge end of the feed transport device is supported thereby in position above the hopper for discharging the material carried thereby downwardly into the hopper;

wherein the feed transport device includes ground wheels thereon adjacent the feed end thereof, the ground wheels being steerable relative to the feed transport device from a first position in which the feed transport device moves radially away from the pivotal connecting means to a second position in which the feed transport device rotates angularly around the pivotal connecting means.

8. The apparatus according to claim 7 wherein the feed transport device comprises a belt arranged for carrying the material on an upper run of the belt.

9. The apparatus according to claim 7 wherein the transportation means of the main transport device comprises an auger flight.

10. The apparatus according to claim 7 including engagement means for locating the feed transport device in the raised position on the guide track wherein the engagement means comprises a pair of lugs each arranged at a respective side of the feed transport means and extending downwardly therefrom to engage a respective side of the guide track.

11. The apparatus according to claim 7 wherein the guide track includes support means carrying the guide track at a position spaced upwardly from the top surface of the tube and parallel thereto and wherein the support means includes a plurality of longitudinally spaced elements each having a strap portion for engaging the tube.

12. A material handling apparatus for transporting a particulate material comprising:

a main transport device having an elongate transportation tube, means for supporting the tube with a lower feed end and an upper discharge end and a transportation means in the tube for moving the material from the lower end to the upper end;

the tube having an open top hopper at the lower feed end thereof;

a feed transport device for moving the material from an initial feed point to the hopper at the lower feed end of the main transport device for transport therein;

the feed transport device comprising an elongate transport body arranged for carrying the material along the transportation body and for supporting the material away from a ground surface as the material is carried from a feed end to a discharge end;

and mounting means for mounting the feed transport device on the transportation tube such that the feed transport device is movable to different positions relative to the lower feed end of the tube;

the mounting means comprising a support head, connecting means pivotally connecting the support head to the transport body of the feed transport device at the discharge end thereof, a guide track extending along a top surface of the tube at the lower end thereof longitudinally of the tube, and means for moving the support head along the guide track from an operating position to a raised position in which the feed transport device is pulled into a transport position on the top surface of the tube;

the support head and the guide track being arranged such that in the operating position the discharge end of the feed transport device is supported thereby in position above the hopper for discharging the material carried thereby downwardly into the hopper;

wherein the feed transportation means of the feed transport device comprises a belt and wherein the feed transport device includes a guide surface at the discharge end of the belt which is inclined downwardly and forwardly of the belt to direct the material downwardly into the hopper of the tube.

13. The apparatus according to claim 12 wherein the support head includes a support arm extending upwardly from the tube and longitudinally of the tube in a direction toward the feed end of the tube.

14. The apparatus according to claim 13 including coupling means engaging between the arm and the feed transport device, the coupling means allowing rotational movement of the feed transport device relative to the arm about a substantially vertical axis.

15. The apparatus according to claim 14 wherein the coupling means is connected to the guide surface.

16. The apparatus according to claim 12 wherein the feed transport device comprises a belt arranged for carrying the material on an upper run of the belt.

17. The apparatus according to claim 12 wherein the transportation means of the main transport device comprises an auger flight.

18. The apparatus according to claim 12 including engagement means for locating the feed transport device in the raised position on the guide track wherein the engagement means comprises a pair of lugs each arranged at a respective side of the feed transport means and extending downwardly therefrom to engage a respective side of the guide track.

19. The apparatus according to claim 12 wherein the guide track includes support means carrying the guide track at a position spaced upwardly from the top surface of the tube and parallel thereto and wherein the support means includes a plurality of longitudinally spaced elements each having a strap portion for engaging the tube.

* * * * *